(12) United States Patent
Maeng

(10) Patent No.: US 11,671,276 B2
(45) Date of Patent: Jun. 6, 2023

(54) ARTIFICIAL REFRIGERATOR AND METHOD FOR CONTROLLING TEMPERATURE OF THE SAME

(71) Applicant: LG ELECTRONICS INC., Seoul (KR)

(72) Inventor: Jichan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 665 days.

(21) Appl. No.: 16/576,636

(22) Filed: Sep. 19, 2019

(65) Prior Publication Data

US 2020/0028706 A1    Jan. 23, 2020

(30) Foreign Application Priority Data

Aug. 30, 2019    (KR) .................. 10-2019-0107103

(51) Int. Cl.
| | |
|---|---|
| H04L 12/28 | (2006.01) |
| F25D 29/00 | (2006.01) |
| G06N 20/00 | (2019.01) |
| H04W 4/70 | (2018.01) |

(52) U.S. Cl.
CPC ........ H04L 12/2829 (2013.01); F25D 29/005 (2013.01); G06N 20/00 (2019.01); H04W 4/70 (2018.02); F25D 2400/28 (2013.01); F25D 2400/34 (2013.01); H04L 2012/285 (2013.01)

(58) Field of Classification Search
CPC ........... H04L 12/2829; H04L 2012/285; F25D 29/005; F25D 2400/28; F25D 2400/34; F25D 2500/04; F25D 2500/06; F25D 2700/06; F25D 29/00; G06N 20/00; G06N 3/0454; G06N 3/0472; G06N 3/008; G06N 3/084; G06N 3/045; G06N 3/047; H04W 4/70; G06Q 30/0613; G06Q 10/08355
See application file for complete search history.

(56) References Cited

U.S. PATENT DOCUMENTS

2015/0330805 A1*  11/2015  Cho et al. ............... G01C 21/36
2017/0061521 A1*  3/2017  Lee et al. ............... G06Q 30/06

* cited by examiner

Primary Examiner — Elizabeth J Martin
Assistant Examiner — Dario Antonio Deleon
(74) Attorney, Agent, or Firm — Lee, Hong, Degerman, Kang & Waimey PC

(57) ABSTRACT

An AI agent includes an information receiver configured to receive a purchase history of an article and determine whether or not a new article for storage in refrigerator requiring refrigeration or freezing storage exists in the purchase history, an information collector configured to collect capacity information on the new article for storage in refrigerator and movement path information on the new article for storage in refrigerator when the new article for storage in refrigerator exists in the purchase history, and an agent controller configured to determine an expected arrival time at which the new article for storage in refrigerator is to be received in a refrigerator based on the movement path information, and transmit the movement path information and the capacity information and the expected arrival time information on the new article for storage in refrigerator to the refrigerator.

6 Claims, 12 Drawing Sheets

ARTIFICIAL REFRIGERATOR AND METHOD FOR CONTROLLING TEMPERATURE OF THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0107103, filed on Aug. 30, 2019, the contents of which are hereby incorporated by reference herein in its entirety.

BACKGROUND

Field of the Disclosure

The present disclosure relates to an AI agent, a control method thereof, a refrigerator associated with an AI agent, and a control method thereof.

Related Art

Recently, home appliances to which an artificial intelligence technology is applied have been released. Among them, an artificial intelligent refrigeration unit serves as a 'kitchen assistant' that guides a diet and recipes, taking into account family members' preferences and expiration dates of storage food materials. An artificial intelligent refrigerator may be linked with a smartphone to perform a remote temperature control function, a door open alarm function, or the like. In addition, the artificial intelligent refrigerator may control a cooling temperature by learning a usage pattern of a user, that is, a change in an internal temperature according to the number of door openings and a timing point.

However, according to the artificial intelligent refrigerator of the related art, the usage pattern in an actual use environment is irregular. Therefore, it is difficult to determine a type of a food material and a freshness maintenance level only by door opening or a temperature change in the refrigerator.

SUMMARY OF THE DISCLOSURE

The present disclosure aims to solve the aforementioned needs and/or problems.

The present disclosure provides an AI agent, a control method thereof, a refrigerator associated with an AI agent, and a control method thereof capable of controlling in advance a cooling temperature of a refrigerator for a constant temperature storage based on a temperature change of an article and a time required until the article is received in the refrigerator.

In an aspect, an AI agent is provided. The AI Agent includes an information receiver configured to receive a purchase history of an article and determine whether or not a new article for storage in refrigerator requiring refrigeration or freezing storage exists in the purchase history, an information collector configured to collect capacity information on the new article for storage in refrigerator and movement path information on the new article for storage in refrigerator when the new article for storage in refrigerator exists in the purchase history, and an agent controller configured to determine an expected arrival time at which the new article for storage in refrigerator is to be received in a refrigerator based on the movement path information, and transmit the movement path information and the capacity information and the expected arrival time information on the new article for storage in refrigerator to the refrigerator.

The AI agent may be implemented as a user portable terminal or a household AI agent.

The capacity information on the new article for storage in refrigerator may include a type and volume of the new article for storage in refrigerator.

The movement path information on the user may include location information and movement means information on a user which is obtained through a user GPS.

The agent controller may further estimate the movement means information on the user and the expected arrival time by learning the past movement history information on the user.

The agent controller may further transmit arrival notification information on the new article for storage in refrigerator based on the movement path information and the expected arrival time information to the refrigerator.

In another aspect, a refrigerator associated with an AI agent is provided. The refrigerator includes a storage room for refrigeration or freezing storage, a receiver configured to receive, from the AI agent, capacity information on a new article for storage in refrigerator requiring the refrigeration or freezing storage in a purchase history of an article, movement path information on the new article for storage in refrigerator, and information on an expected arrival time at which the new article for storage in refrigerator is to be received in the storage room, and refrigerator controller configured to determine an expected storage location of the new article for storage in refrigerator in the storage room based on the capacity information on the new article for storage in refrigerator, estimate a temperature change of the new article for storage in refrigerator based on the capacity information on the new article for storage in refrigerator, the movement path information, and the expected arrival time information, determine a target waiting temperature based on the estimated temperature change of the new article for storage in refrigerator, and thereafter, intensively precool the expected storage location of the new article for storage in refrigerator according to the target waiting temperature.

The refrigerator controller may intensively precool the expected storage location of the new article for storage in refrigerator such that a temperature at the expected storage location of the new article for storage in refrigerator converges to the target waiting temperature at the expected arrival time of the new article for storage in refrigerator.

The refrigerator controller may predict a temperature reaching time at which a current temperature at the expected storage location of the new article for storage in refrigerator reaches the target waiting temperature, and control a temperature for the precooling based on the expected arrival time of the new article for storage in refrigerator and the predicted temperature reaching time.

The refrigerator controller may control the temperature for the precooling by a Proportional Integral Derivative control (PID) method based on the expected arrival time of the new article for storage in refrigerator and the predicted temperature reaching time.

The receiver may further receive arrival notification information on the new article for storage in refrigerator from the AI agent, and the refrigerator controller may inform the user of the expected storage location of the new article for storage in refrigerator through at least one of a visual control method and an audible control method if the arrival notification information and an access of the user are detected.

In still another aspect, a control method of an AI agent is provided. The control method includes receiving a purchase history of an article and determining whether or not a new article for storage in refrigerator requiring refrigeration or freezing storage exists in the purchase history, collecting capacity information on the new article for storage in refrigerator and movement path information on the new article for storage in refrigerator when the new article for storage exists in the purchase history, and determining an expected arrival time at which the new article for storage in refrigerator is to be received in the refrigerator based on the movement path information, and transmitting the movement path information, and the capacity information and the expected arrival time information on the new article for storage in refrigerator to the refrigerator.

In still another aspect, a control method of a refrigerator which has a storage room for refrigeration or freezing storage and is associated with an AI agent is provided. The control method of a refrigerator includes receiving, from the AI agent, capacity information on a new article for storage in refrigerator requiring the refrigeration or freezing storage in a purchase history of an article, movement path information on the new article for storage in refrigerator, and information on an expected arrival time at which the new article for storage in refrigerator is to be received in the storage room, determining an expected storage location of the new article for storage in refrigerator in the storage room based on the capacity information on the new article for storage in refrigerator, estimating a temperature change of the new article for storage in refrigerator based on the capacity information, the movement path information, and the expected arrival time information on the new article for storage in refrigerator, and determining a target waiting temperature based on the estimated temperature change of the new article for storage in refrigerator, and intensively precooling the expected storage location of the new article for storage in refrigerator according to the target waiting temperature.

According to the present disclosure, it is possible to more effectively the freshness of the article by controlling in advance the cooling temperature of the refrigerator for a constant temperature storage based on the temperature change of the article and the expected arrival time until the article is received in the refrigerator.

According to the present disclosure, it is possible to provide additional value to the user by enabling an efficient operation of the refrigerator by recognizing life/behavior pattern of the user.

Effects obtained in the present disclosure are not limited to the effects mentioned above, and various effects are included in the present specification.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
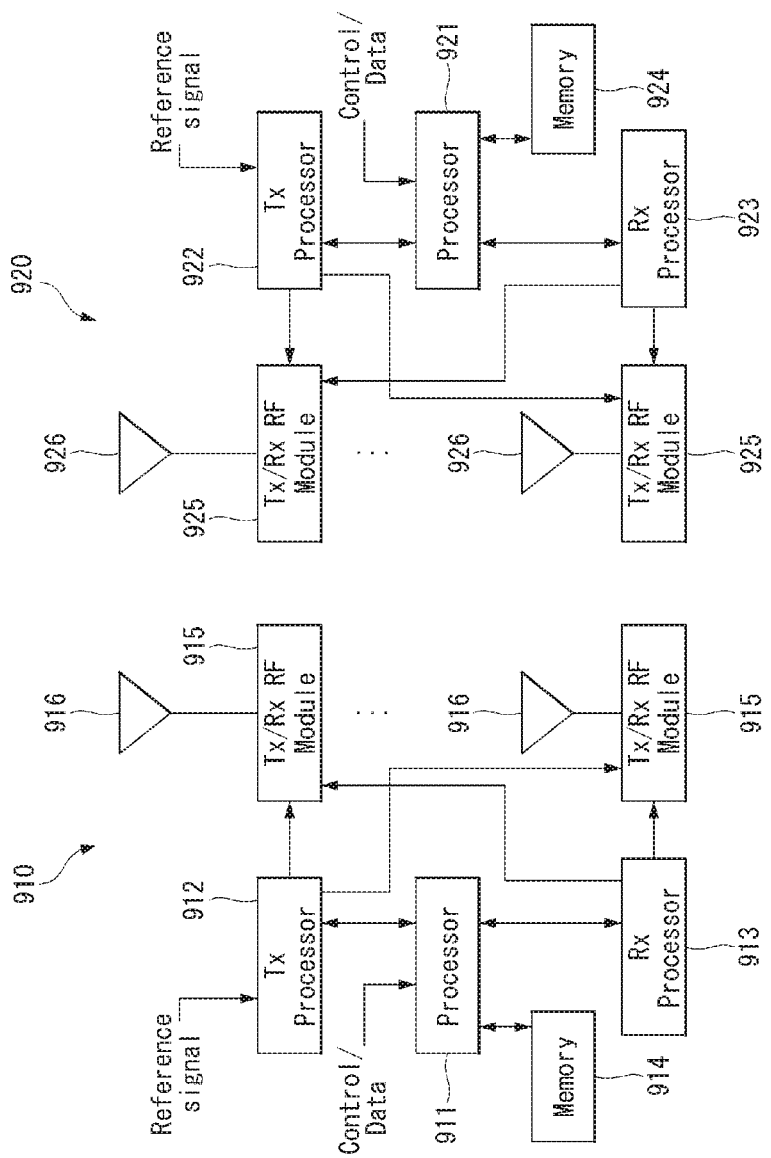
FIG. 1 illustrates one embodiment of an AI device.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
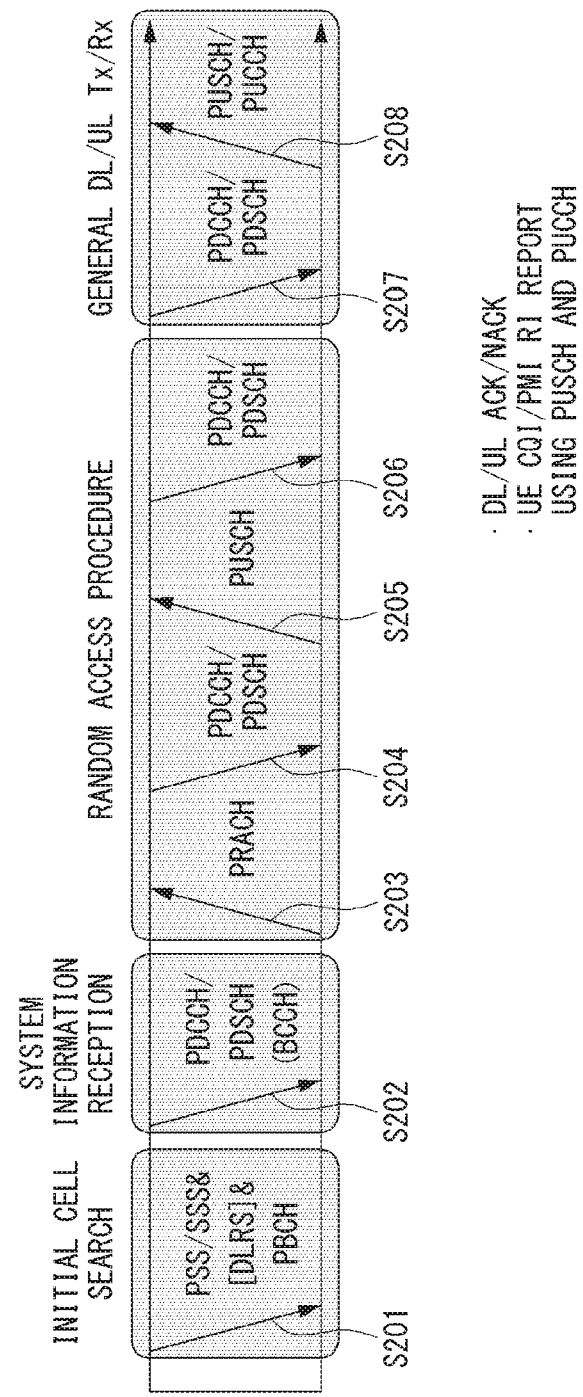
FIG. 2 illustrates a block diagram of a wireless communication system to which the methods proposed herein may be applied.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

An UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Using 5G Communication

Figure 3:
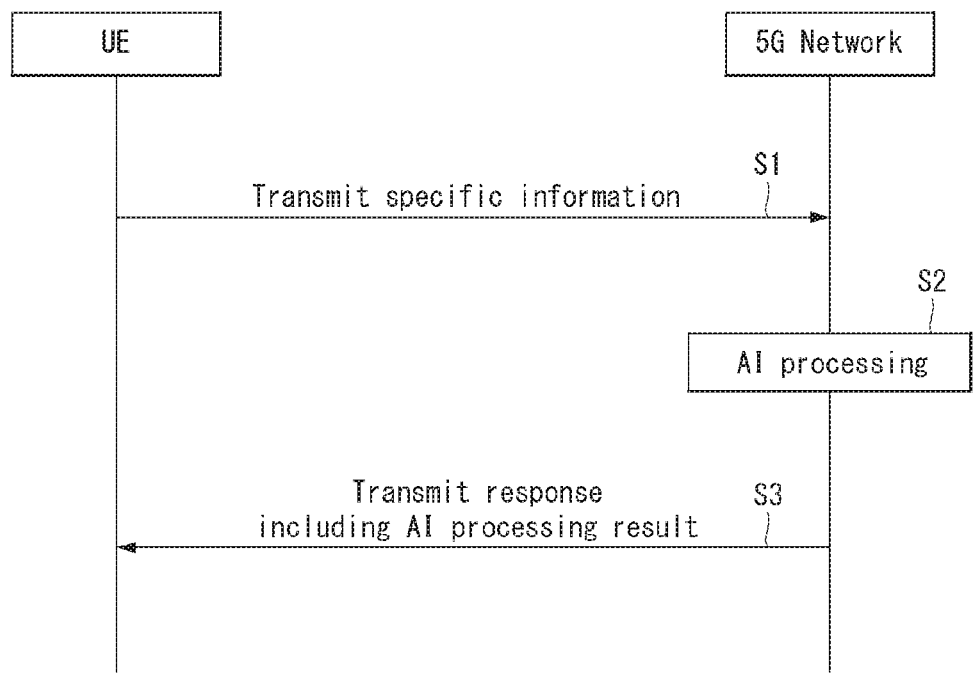
FIG. 3 illustrates an example of a signal transmission/reception method in a wireless communication system.

FIG. 3 shows an example of basic operations of an UE and a 5G network in a 5G communication system.

The UE transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the UE (S3).

G. Applied Operations Between UE and 5G Network in 5G Communication System

Hereinafter, the operation of an UE using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the UE performs an initial access procedure and a random access procedure with the 5G network prior to step S1 of FIG. 3 in order to transmit/receive signals, information and the like to/from the 5G network.

More specifically, the UE performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission. The 5G network can transmit, to the UE, a UL grant for scheduling transmission of specific information. Accordingly, the UE transmits the specific information to the 5G network on the basis of the UL grant. In addition, the 5G network transmits, to the UE, a DL grant for scheduling transmission of 5G processing results with respect to the specific information. Accordingly, the 5G network can transmit, to the UE, information (or a signal) related to remote control on the basis of the DL grant.

Next, a basic procedure of an applied operation to which a method proposed by the present disclosure which will be described later and URLLC of 5G communication are applied will be described.

As described above, an UE can receive DownlinkPreemption IE from the 5G network after the UE performs an initial access procedure and/or a random access procedure with the 5G network. Then, the UE receives DCI format 2_1 including a preemption indication from the 5G network on the basis of DownlinkPreemption IE. The UE does not perform (or expect or assume) reception of eMBB data in resources (PRBs and/or OFDM symbols) indicated by the preemption indication. Thereafter, when the UE needs to transmit specific information, the UE can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the UE receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the UE transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
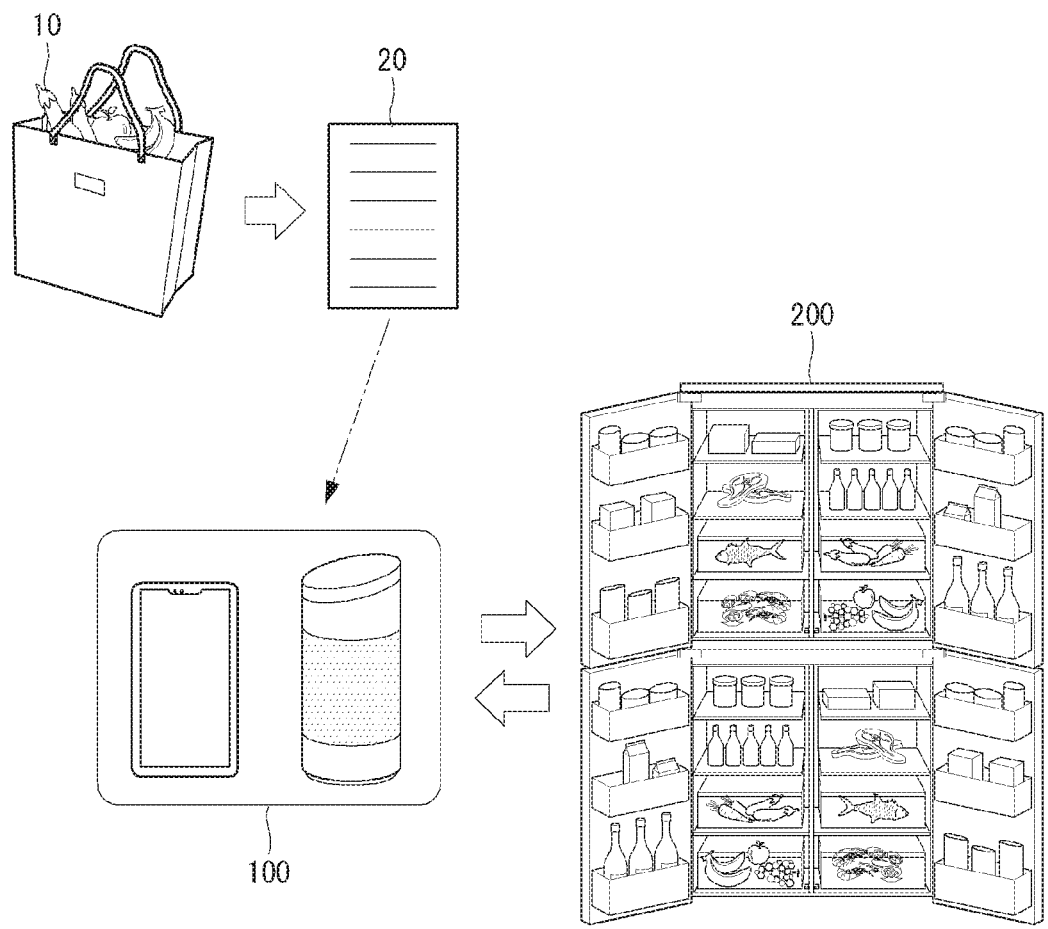
FIGS. 4 and 5 are block diagrams schematically showing a linkage system between an AI agent and a refrigerator according to an embodiment of the present disclosure.
Figure 5:
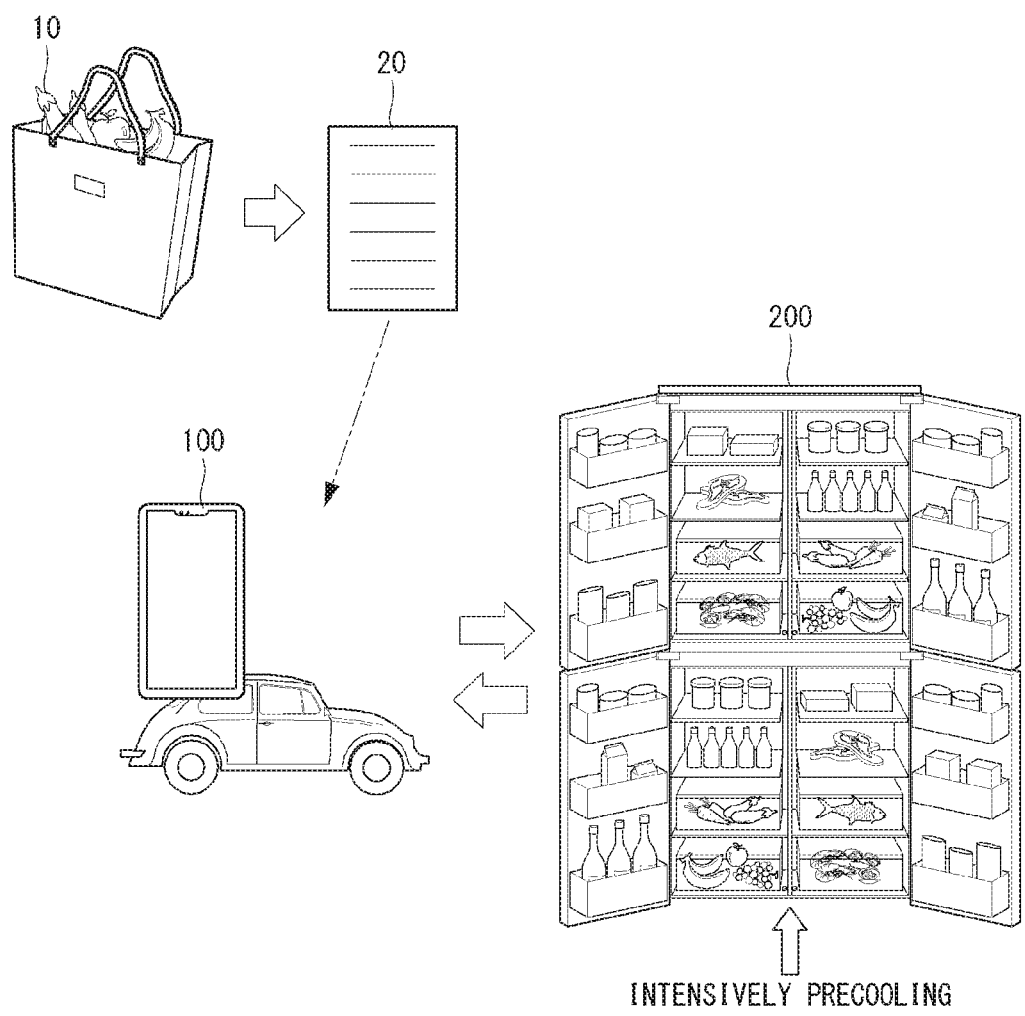

FIGS. 4 and 5 are block diagrams schematically showing a linkage system between an AI agent and a refrigerator according to an embodiment of the present disclosure.

With reference to FIGS. 4 and 5, the linkage system of the AI agent and the refrigerator according to the embodiment of the present disclosure may include an AI agent 100 and a refrigerator 200.

The AI agent 100 may be implemented as a user portable terminal or a household AI agent. The AI agent 100 receives a purchase history 20 of an article 10. The AI agent 100 confirms a new article requiring refrigeration/freezing storage in the received article purchase history 20 and collects capacity information on the new article. When there is the new article requiring the refrigeration/freezing storage, the AI agent 100 determines an expected arrival time of the new article based on movement path information such as a location of a user who owns the new article.

The refrigerator 200 is associated with the AI agent 100. The refrigerator 200 receives the movement path information, the capacity information, and the expected arrival time information on the new article from the AI agent 100. The refrigerator 200 determines an expected storage location of the new article in a storage room based on the capacity information on the new article. In addition, the refrigerator 200 estimates a temperature change during movement of the new article based on the movement path information, the capacity information, and the expected arrival time information on the new article, determines a target waiting temperature based on the estimated temperature change of the new article, and thereafter, intensively precools the expected storage location of the new article according to the target waiting temperature. Here, "precooling" means lowering the expected storage location of the new article to the target waiting temperature in advance before the new article arrives (that, before the new article is received) in the refrigerator.

The linkage system of the present disclosure can provide additional value to the user by enabling an efficient operation of the refrigerator by recognizing life/behavior pattern of the user.

Figure 6:
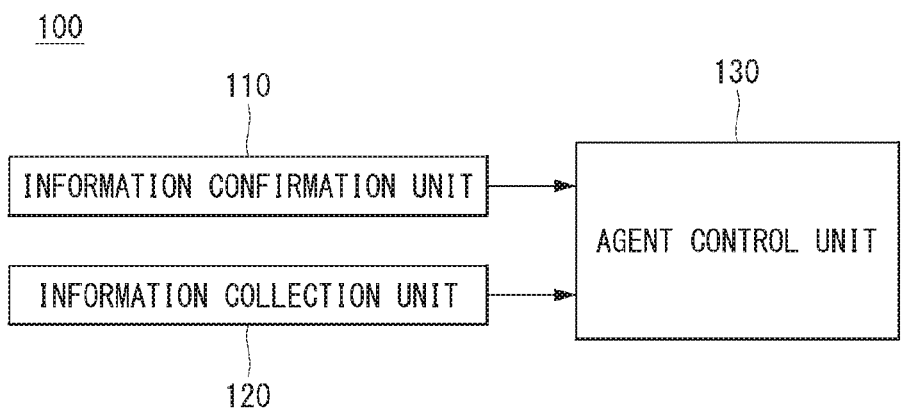
FIG. 6 is a block diagram showing a configuration of the AI agent according to an embodiment of the present disclosure.
Figure 7:
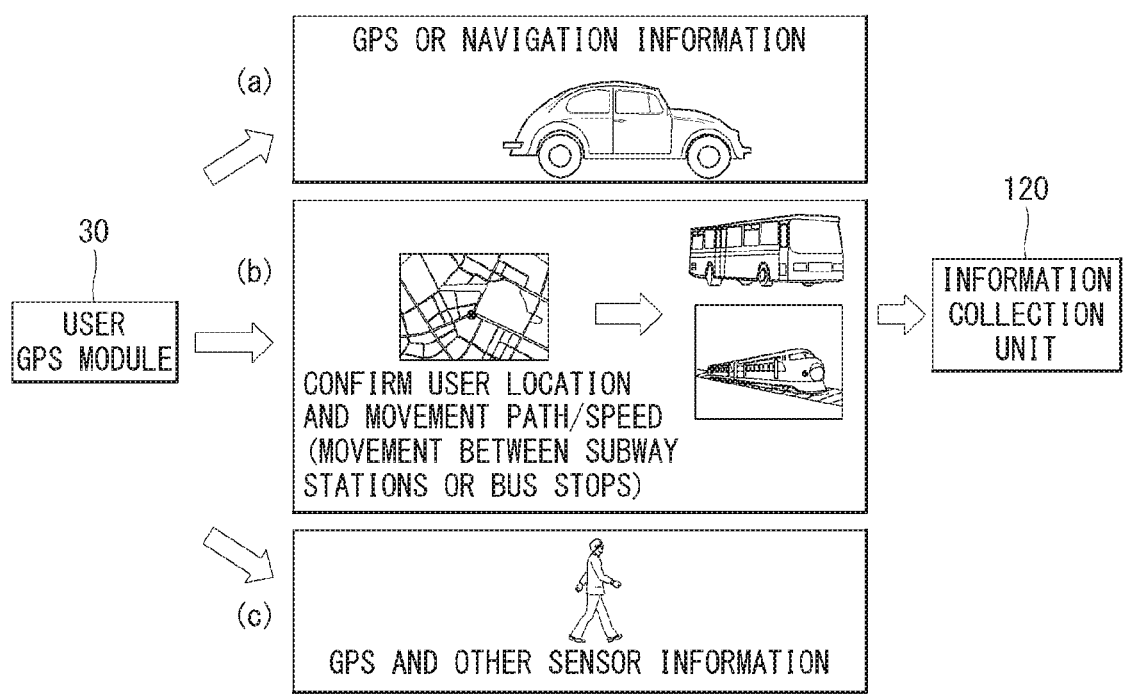
FIG. 7 is a diagram for explaining that the AI agent collects capacity information and movement path information on a new article for storage in a refrigerator according to an embodiment of the present disclosure.
Figure 8:
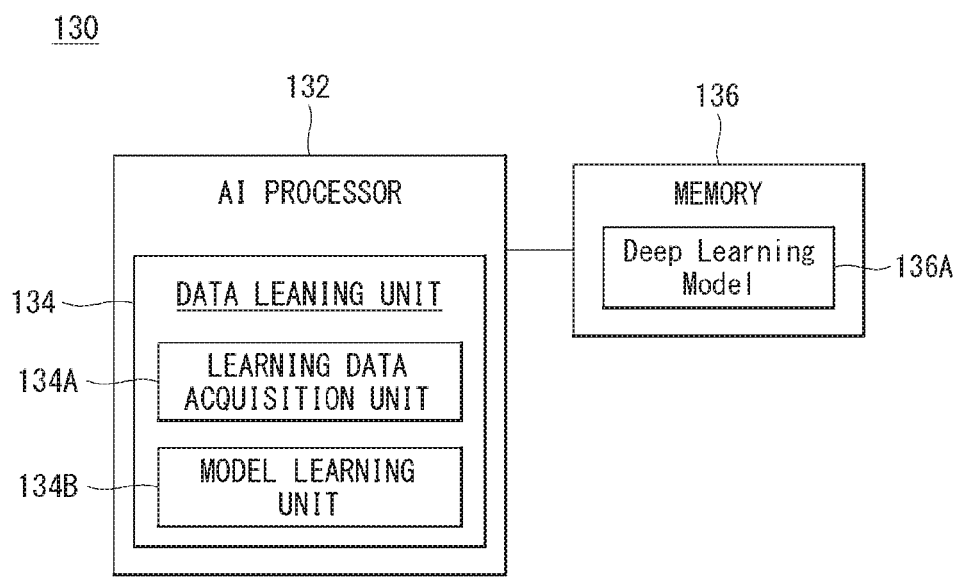
FIG. 8 is a block diagram showing an AI processor and a memory provided in the AI agent according to an embodiment of the present disclosure.

FIG. 6 a block diagram showing a configuration of the AI agent according to an embodiment of the present disclosure. FIG. 7 is a diagram for explaining that the AI agent collects the capacity information and the movement path information on the new article for storage in refrigerator according to an embodiment of the present disclosure. In addition, FIG. 8 is a block diagram showing an AI processor and a memory provided in the AI agent according to an embodiment of the present disclosure.

With reference to FIG. 6, the AI agent 100 may include an information confirmation unit 110, an information collection unit 120, and an agent control unit 130 according to the embodiment of the present disclosure.

The information confirmation unit 110 receives a purchase history of an article and determines whether or not there is an article (hereinafter, referred to as "new article for storage in refrigerator) requiring refrigeration or freezing storage.

When the new article for storage in refrigeration exists in the purchase history, the information collection unit 120 collects the capacity information on the new article for storage in refrigeration and collects the movement path information on the new article for storage in refrigerator. The capacity information on the new article for storage in refrigerator includes a type and a volume of the new article for storage in the refrigerator. Moreover, the movement path information on the user includes location information and movement means information on the user obtained through a user GPS.

As shown in FIG. 7, the information collection unit 120 may collect the movement path information on the new article for storage in refrigerator from a user GPS module 30. The user GPS module 30 may be implemented as a vehicle navigation device or a user portable terminal (wearable smart device, mobile phone, or the like), but is not limited thereto. The user GPS module 30 may be implemented as a location/speed sensor (for example, a gyro sensor) or the like.

When the new article for storage in refrigerator is moved through a self-car, the information collection unit 120 may collect a movement location of the new article through location information on a mobile terminal of a user who boarded the self-car and vehicle GPS information. In addition, when the new article for storage in refrigerator is moved through a bus or subway, the information collection unit 120 may inform collect the movement location of the new article through location information on a mobile terminal of a user carrying the new article for storage in refrigerator and vehicle GPS information. In addition, when the new article for storage in refrigerator is moved through walking of the user, the moving location of the new article may be collected through location information on a mobile terminal of the user and other sensors (gyro sensor, or the like).

The agent control unit 130 determines the expected arrival time, at which the new article for storage in refrigerator is to be received in the refrigerator, based on the movement path information, and transmits the movement path information, the capacity information on the new article for storage in refrigerator, and the expected arrival time information to the refrigerator through a communication network.

The communication network may be implemented as a telecommunication network such as a code division multiple access (CDMA), a frequency division multiple access (FDMA), a time division multiple access (TDMA), an orthogonal frequency division multiple access (OFDMA), a single carrier frequency division multiple access (SCFDMA), or a 5G, but is not limited thereto. The communication network may be implemented as a local area network such as a Bluetooth, a Radio Frequency Identification (RFID), an Infrared Data Association (IrDA), an Ultra Wideband (UWB), a ZigBee, or a Wireless Fidelity (Wi-Fi).

When the AI agent 100 is implemented as a user portable terminal, the communication network between the AI agent 100 and the refrigerator 200 may be implemented as a telecommunication network. When the AI agent 100 is implemented as the household AI agent, the communication network between the AI agent 100 and the refrigerator 200 may be implemented as the local area network.

Meanwhile, the agent control unit 130 may additionally estimate the movement means information on the user and the expected arrival time by learning past movement history information on the user. To this end, the agent control unit 130 may further include an AI processor 132 and a memory 136 as shown in FIG. 8.

The AI processor 132 is an artificial intelligence processor equipped with a neural network model. The AI processor 132 may learn the past movement history information on the user through AI processing to estimate the movement means information on the user and the expected arrival time. The AI processor 132 has an advantage of more accurately determining the movement means information on the user and the expected arrival time in case where performance of the user GPS module 30 is degraded.

The AI processor 132 may learn a neural network using a program stored in the memory 136. In particular, the AI processor 132 may learn a neural network for recognizing data related to past movement history information. Here, the neural network for recognizing the past movement history information may be designed to simulate a human brain structure on a computer, and may include a plurality of weighted network nodes which simulate neurons of a human neural network. The plurality of network nodes may transmit and receive data according to a connection relationship so that neurons simulate the synaptic activity of neurons that transmit and receive signals through synapses. The neural network may include a deep learning model developed from a neural network model. In the deep learning model, the plurality of network nodes may be located at different layers and may transmit or receive data according to a convolutional connection relationship. An example of the neural network model includes various deep learning methods such as deep neural networks (DNN), convolutional deep neural networks (CNN), a Recurrent Boltzmann Machines (RNN), a Restricted Boltzmann Machines (RBM), and deep belief networks (DBN), or a Deep Q-Network, and may be applied to fields such as computer vision, speech recognition, natural language processing, or voice/signal processing.

The memory 136 may store various programs and data necessary to estimate the movement means information on the user and the expected arrival time. The memory 136 may be implemented as a nonvolatile memory, a volatile memory, a flash-memory, a hard disk drive (HDD), a solid state drive (SDD), or the like. The memory 136 is accessed by the AI processor 132, and may read/write/modify/delete/update data by the AI processor 132. In addition, the memory 136 may store a neutral network model (for example, a deep learning model 136A) for classifying and recognizing learning data according to an embodiment of the present disclosure.

Meanwhile, the AI processor 132 may further include a data learning unit 134 for learning the neural network related to estimating the movement means information on the user and the expected arrival time. The data learning unit 134 may learn a criterion about which learning data to use to determine classification/recognition of data related to estimating the movement means information on the user and the expected arrival time or may learn a criterion how to classify and recognize the data using the learning data. The data learning unit 134 may acquire necessary learning data and apply the acquired learning data to the deep learning model.

The data learning unit 134 may be manufactured in the form of at least one hardware chip and mounted on the AI processor 132. For example, the data learning unit 134 may be manufactured in the form of a dedicated hardware chip for artificial intelligence (AI), or may be manufactured as a portion of a general purpose processor (CPU) or a graphics dedicated processor (GPU) to be mounted on the AI processor 132. In addition, the data learning unit 134 may be implemented as a software module. When the data learning unit 134 is implemented as the software module (or program module including instruction), the software module may be stored in a computer readable non-transitory computer readable media. In this case, at least one software module may be provided by an operating system (OS) or by an application.

The data learning unit 134 may include a learning data acquisition unit 134A and a model learning unit 134B.

The learning data acquisition unit 134A may acquire learning data necessary for the neutral network model. For example, as the learning data, the learning data acquisition unit 134A may acquire, as sample data, the movement means information on the user and the expected arrival time to be input to the neutral network model.

The model learning unit 134B may learn to use the acquired learning data to have a criterion of determining how the neutral network model classifies predetermined data. In this case, the model learning unit 134B may learn the neutral network model through supervised learning which uses at least some of the learning data as a determination criterion. Alternatively, the model learning unit 134B may learn the neutral network model through unsupervised learning which finds the determination criterion by performing self-learning using the learning data without supervision. In addition, the model learning unit 134B may learn the neutral network model through reinforcement learning using feedback related to whether or not a result of situation determination according to the learning is correct. In addition, the model learning unit 134B may learn the neutral network model using a learning algorithm including an error back-propagation method or a gradient decent method.

If the neutral network model is learned, the model learning unit 134B may store the learned neutral network model in the memory 136. The model learning unit 134B may store the learned neutral network model in the memory 136 of a learning server connected to the AI processor 132 through a wired or wireless network.

The data learning unit 134B may further include a learning data preprocessing unit (not shown) and a learning data selection unit (not shown) to improve an analysis result of a recognition model or to save a resource or time required for generating the recognition model.

The learning data preprocessing unit may preprocess the acquired data so that the acquired data can be used for learning for the situation determination. For example, the learning data preprocessing unit may process the acquired data into a predetermined format so that the model learning unit 134B can use the learning data acquired for learning for image recognition.

The learning data selection unit may select data required for learning of the learning data acquired by the learning data acquisition unit 134A or the learning data preprocessed by the preprocessing unit. The selected learning data may be provided to the model learning unit 134B.

In addition, the data learning unit 134 may further include a model evaluation unit (not shown) to improve an analysis result of the neutral network model.

The model evaluation unit may input evaluation data into the neutral network model, and cause the model learning unit 134B to learn again when an analysis result output from the evaluation data does not satisfy a predetermined criterion. In this case, the evaluation data may be predefined data for evaluating the recognition model. For example, when among the analysis results of the recognition model learned for the evaluation data, the number or a ratio of the evaluation data having inaccurate analysis results exceeds a preset threshold value, the model evaluation unit may evaluate that a predetermined criterion is not satisfied.

Meanwhile, in the agent control unit 130, the AI processor 132 and the memory 136 may be integrated into one module and may be referred to as an AI module.

Meanwhile, the agent control unit 130 may further transmit arrival notification information on the new article for storage in refrigerator to the refrigerator based on the movement path information and the information on the expected arrival time.

Figure 9:
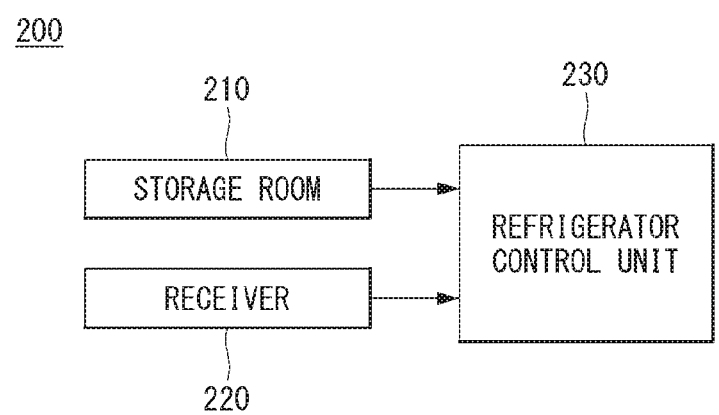
FIG. 9 is a block diagram showing a configuration of the refrigerator according to an embodiment of the present disclosure.
Figure 10:
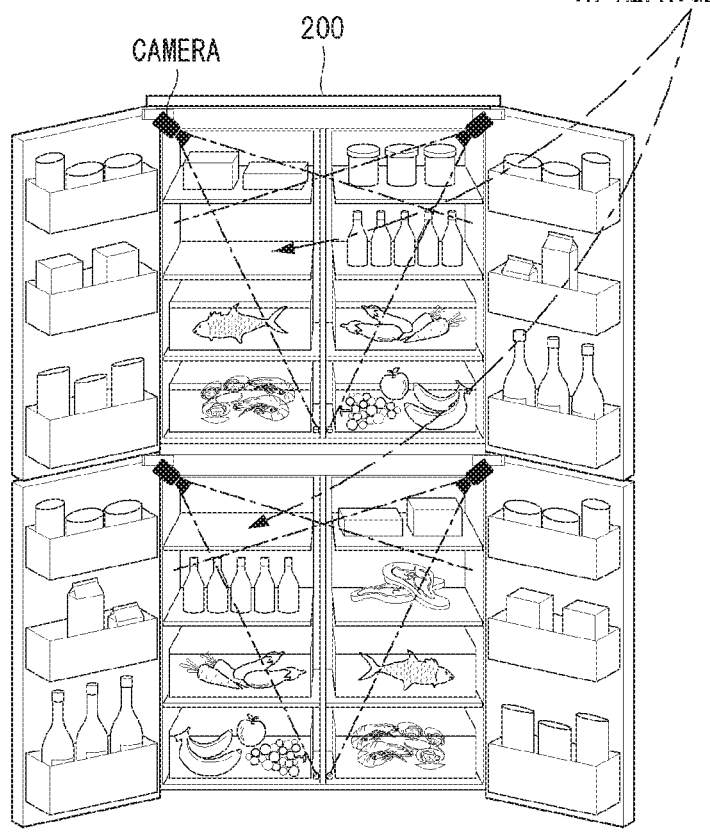
FIG. 10 is a diagram showing that a capacity of the new article for storage in refrigerator is confirmed and an empty space in the refrigerator is confirmed according to an embodiment of the present disclosure.
Figure 11:
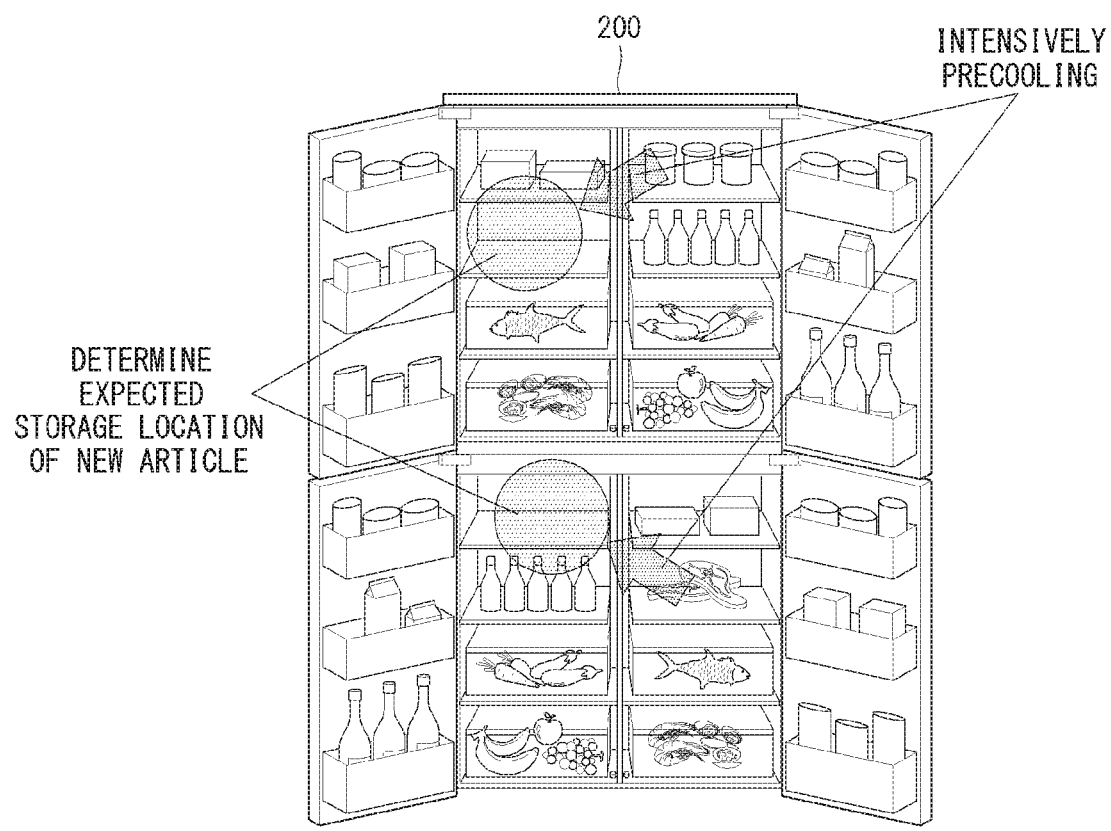
FIG. 11 is a diagram showing that an expected storage location of the new article for storage in refrigerator is determined and the expected storage location is intensively precooled in the refrigerator according to an embodiment of the present disclosure.
Figure 12:
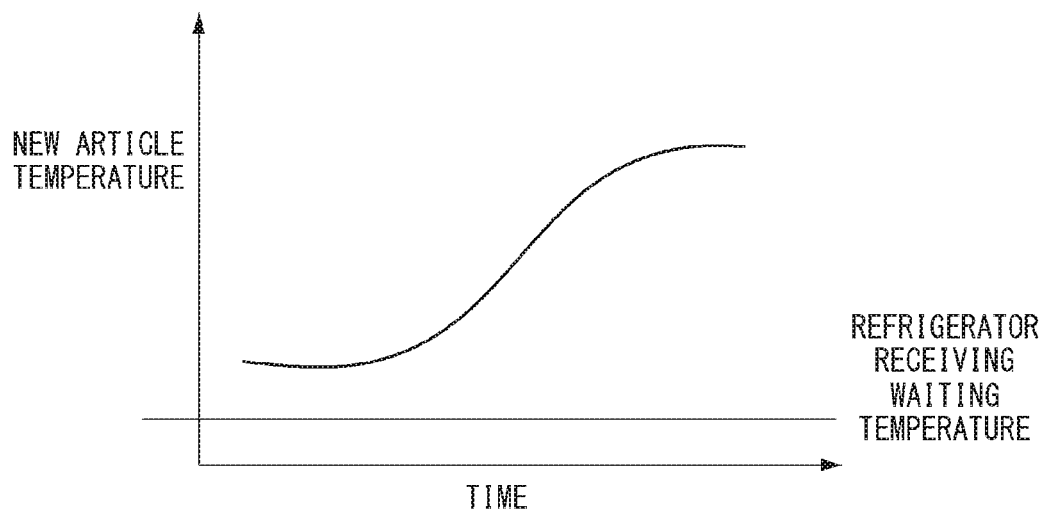
FIG. 12 is a graph showing an example of a temperature change of the new article for storage in refrigerator during movement.
Figure 13:
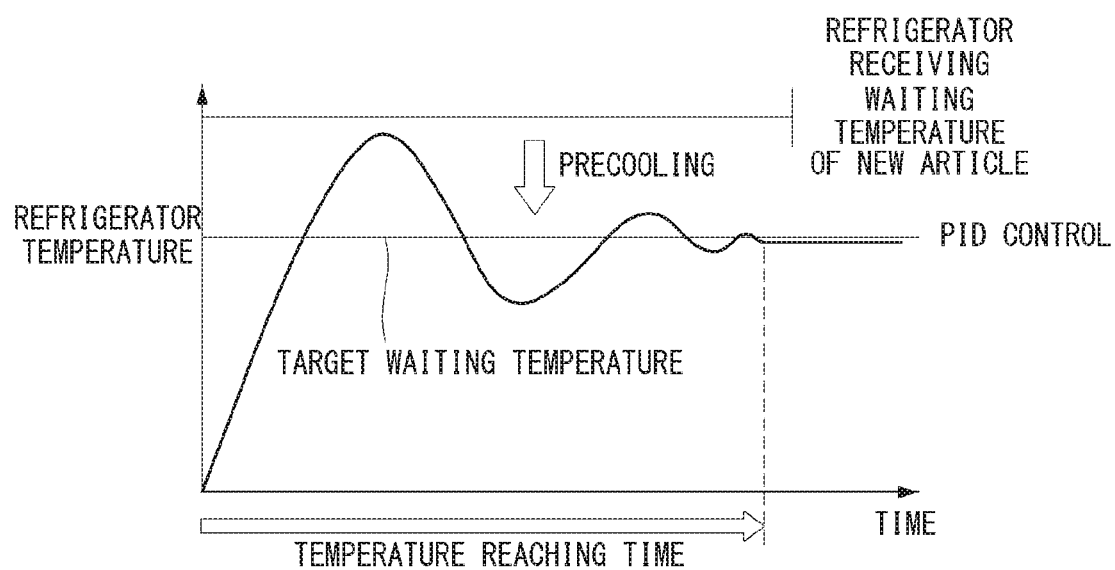
FIG. 13 is a graph showing an example of determining a target waiting temperature based on the temperature change of the new article for storage in refrigerator during the movement.

FIG. 9 is a block diagram showing a configuration of the refrigerator according to an embodiment of the present disclosure. FIG. 10 is a diagram showing that a capacity of the new article for storage in refrigerator is confirmed and an empty space in the refrigerator is confirmed according to an embodiment of the present disclosure. FIG. 11 is a diagram showing that an expected storage location of the new article for storage in refrigerator is determined and the expected storage location is intensively precooled in the refrigerator according to an embodiment of the present disclosure. FIG. 12 is a graph showing an example of a temperature change of the new article for storage in refrigerator during movement. FIG. 13 is a graph showing an example of determining a target waiting temperature based on the temperature change of the new article for storage in refrigerator during the movement.

With reference to FIG. 9, according to an embodiment of the present disclosure, the refrigerator 200 associated with the AI agent 100 includes a storage room 210, a receiver 220, and a refrigerator controller 230.

The storage room 210 includes refrigerated and freezing compartments in which the article is to be stored. Each of the refrigeration compartment and the freezing compartment may be constituted by a plurality of compartments which can individually control a temperature.

The receiver 220 receives, from the AI agent, capacity information on a new article for storage in refrigerator requiring refrigeration or freezing storage in the purchase history of the article, movement path information on the new article for storage in refrigerator, and information on an expected arrival time at which the new article for storage in refrigerator is to be received in the storage room.

The receiver 220 may further receive arrival notification information on the new article for storage in refrigerator, from the AI agent 100.

The refrigerator control unit 230 confirms the capacity information on the new article for storage in refrigerator as shown in FIG. 10, and confirms an empty compartment of the refrigerator corresponding to the confirmed capacity information. The refrigerator control unit 230 may confirm the empty compartment by analyzing a photographed image input through a camera, a vision sensor, or the like provided in the refrigerator. In addition, the refrigerator control unit 230 determines the empty compartment of the storage room as an expected storage location of the new article for storage in refrigerator, based on the capacity information on the new article for storage in refrigerator as shown in FIG. 11.

The refrigerator controller 230 estimates the temperature change of the new article for storage in refrigerator based on the capacity information on the new article for storage in refrigerator, the movement path information, and the expected arrival time information. As an example, the temperature of the new article for storage in refrigerator may be gradually increased from a temperature (that is, a refrigerator receiving waiting temperature) at which the article is initially purchased, as shown in FIG. 12, and the refrigerator control unit 230 may detect the temperature change based on the capacity information on the new article for storage in refrigerator, the movement path information, and the expected arrival time information.

After the refrigerator control unit 230 determines a target waiting temperature based on the estimated temperature change of the new article for storage in refrigerator, the refrigerator control unit 230 intensively precools the expected storage location of the new article for storage in refrigerator according to the target waiting temperature as shown in FIG. 10. The target waiting temperature is lower than the estimated temperature of the new article for storage in refrigerator as shown in FIG. 13.

The refrigerator controller 230 may intensively precool the expected storage location of the new article for storage in refrigerator such that the temperature at the expected storage location of the new article for storage in refrigerator converges to the target waiting temperature at the expected arrival time of the new article for storage in refrigerator.

As shown in FIG. 13, the refrigerator controller 230 predicts a temperature reaching time at which a current temperature at the expected storage location of the new article for storage in refrigerator reaches the target waiting temperature, and may control the temperature for precooling based on the expected arrival time of the new article for storage in refrigerator and the predicted temperature reaching time. In addition, the refrigerator control unit 230 may transmit the predicted temperature reaching time to the AI agent 100 to increase efficiency of a linkage operation with the AI agent 100.

As shown in FIG. 13, the refrigerator control unit 230 may control the temperature for precooling by a Proportional Integral Derivative control (PID) method based on the expected arrival time of the new article for storage in refrigerator and the predicted temperature reaching time.

If the arrival notification information is input from the receiver 220 and an access of the user having the new article for storage in refrigerator is detected through a camera or a vision sensor installed outside the refrigerator, the refrigerator control unit 230 notifies the user of the expected storage location of the new article for storage in refrigerator through at least one of a visual control method and an audible control method to guide a receiving proposal space.

Here, the visual control method may include distinguishably displaying the expected storage location on a display unit provided on a front surface of a door of the refrigerator, distinguishably illuminating a compartment (to be preferentially illuminated) corresponding to the expected storage location, and informing the user of the expected storage location information by a mobile phone of the user. The audible control method may include a voice notification such as "please put it in a first upper compartment on a left side of the refrigerator!". The audible control method may be implemented through the mobile phone of the user.

Figure 14:
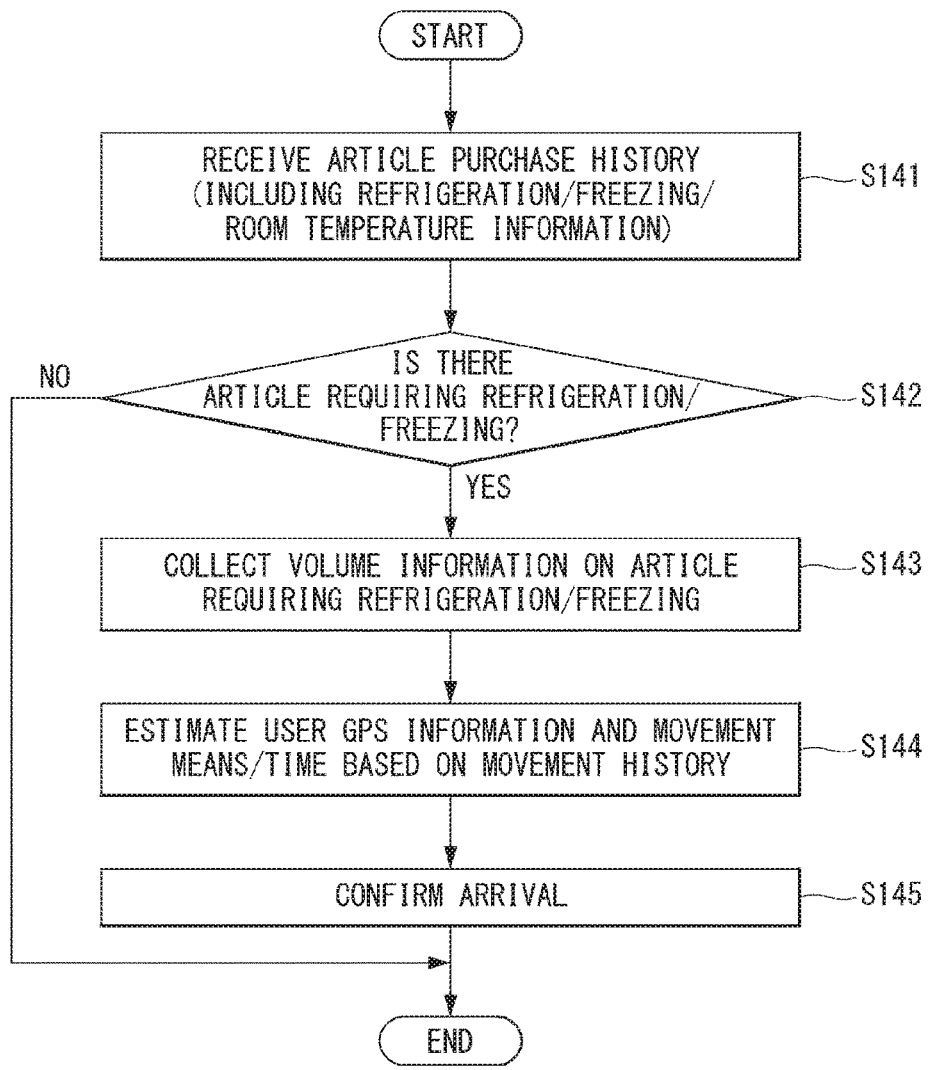
FIG. 14 is a flow chart showing a control method of the AI agent according to an embodiment of the present disclosure.

FIG. 14 is a flow chart showing a control method of the AI agent according to an embodiment of the present disclosure.

With reference to FIG. 14, the control method of the AI agent receives details of a purchase article including temperature information for refrigeration/freezing/room temperature storage (S141).

The control method of the AI agent determines whether or not the new article for storage in refrigerator requiring refrigeration or freezing storage exists in the purchase history (S142).

When the new article for storage in refrigerator requiring refrigeration or freezing storage exists in the purchase history, the control method of the AI agent collects the capacity information on the new article for storage in refrigerator and collects the movement path information (including location information and movement means information on the article) on the new article for storage in refrigerator (S143).

The control method of the AI agent determines the expected arrival time at which the new article for storage in refrigerator is to be received in the refrigerator, based on the movement path information, and transmits the movement path information, and the capacity information and the expected arrival time information on the new article for storage in refrigerator to the refrigerator (S144).

The control method of the AI agent transmits the arrival notification information on the new article for storage in refrigerator to the refrigerator, based on the movement path information and the expected arrival time information (S145).

Figure 15:
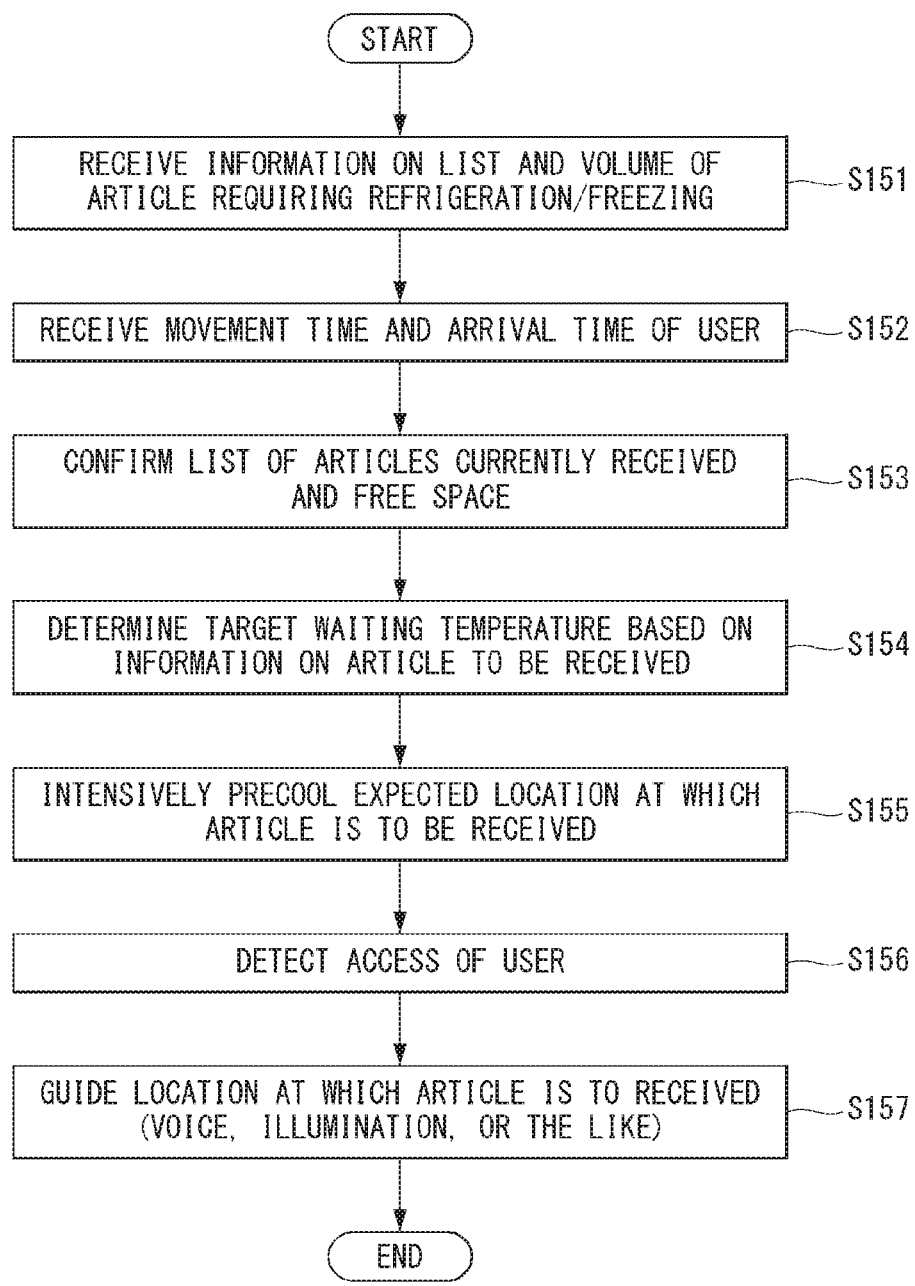
FIG. 15 is a flow chart showing a control method of the refrigerator according to an embodiment of the present disclosure.

FIG. 15 is a flow chart showing a control method of the refrigerator according to an embodiment of the present disclosure.

With reference to FIG. 15, a control method of the refrigerator associated with the AI agent receives, from the AI agent, the capacity information on the new article for storage in refrigerator requiring the refrigeration or freezing storage in the purchase history of the article, the movement path information on the new article for storage in refrigerator, and the information on the expected arrival time at which the new article for storage in refrigeration is to be received in the storage room (S151, S152).

The control method of the refrigerator associated with the AI agent confirms a free space in the storage room based on the capacity information on the new article for storage in refrigeration and determines the free space as the expected storage location of the new article for storage in refrigerator (S153).

The control method of the refrigerator associated with the AI agent estimates the temperature change of the new article for storage in refrigerator based on the capacity information on the new article for storage in refrigerator, the movement path information, and the expected arrival time information, and determines the target waiting temperature based on the estimated temperature change of the new article for storage in refrigerator (S154).

The control method of the refrigerator associated with the AI agent intensively precools the expected storage location of the new article for storage in refrigerator according to the target waiting temperature (S155).

The control method of the refrigerator associated with the AI agent receives the arrival notification information on the new article for storage in refrigerator from the AI agent, and informs the user of the expected storage location of the new article for storage in refrigerator through at least one of the visual control method and the audible control method if the arrival notification information and the access of the user are detected (S156, S157).

In the intensively precooling (S155) of the expected storage location of the new article for storage in refrigerator according to the target waiting temperature, the expected storage location of the new article for storage in refrigerator is intensively precooled such that the temperature at the expected storage location of the new article for storage in refrigerator converges to the target waiting temperature at the expected arrival time of the new article for storage in refrigerator.

The intensively precooling (S155) of the expected storage location of the new article for storage in refrigerator according to the target waiting temperature includes predicting a temperature reaching time at which a current temperature at the expected storage location of the new article for storage in refrigerator reaches the target waiting temperature, and controlling a temperature for the precooling based on the expected arrival time of the new article for storage in refrigerator and the predicted temperature reaching time.

The controlling of the temperature for the precooling based on the expected arrival time of the new article for storage in refrigerator and the predicted temperature reaching time instructs controlling the temperature for precooling by a Proportional Integral Derivation (PID) control method based on the expected arrival time of the new article for storage in refrigerator and the predicted temperature reaching time.

As described above, according to the present disclosure, the cooling temperature of the cold room for a constant temperature storage is controlled in advance based on the temperature change during the carrying of the article requiring the refrigeration or freezing storage and the expected arrival time until the article is received in the refrigerator, and thus, it is possible to more effectively maintain freshness of the article.

Therefore, the above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. An AI agent comprising:
an information receiver configured to obtain purchase history of at least one article in transit to a refrigerator location corresponding to a refrigerator;
determine that a new article of the at least one article in transit requires refrigeration or freezing storage at the refrigerator;
an information collector configured to obtain size information of the new article and movement path information related to the new article based on a location of a user transferring the new article; and
an agent controller configured to:
determine an expected arrival time of the new article for storage in the refrigerator based on the movement path information during transit of the new article, and
transmit to the refrigerator, during transit of the new article, the movement path information, the size information, and the expected arrival time information of the new article for adjusting a setting of the refrigerator in preparation for storage of the new article in the refrigerator upon arrival at the refrigerator location.

2. The AI agent of claim 1, wherein the AI agent is implemented as a user portable terminal or a household AI agent.

3. The AI agent of claim 1, wherein the capacity information on the new article for storage in refrigerator includes a type and volume of the new article for storage in refrigerator.

4. The AI agent of claim 1, wherein the movement path information on the new article for storage in the refrigerator includes location information and movement means information on the user which is obtained through a user GPS.

5. The AI agent of claim 4, wherein the agent controller is further configured to: estimate the movement means information on the user and the expected arrival time by learning a past movement history information on the user.

6. A control method of an AI agent, the control method comprising:
- obtaining a purchase history of at least one article in transit to a refrigerator location corresponding to a refrigerator;
- determining that a new article of the at least one article in transit requires refrigeration or freezing storage;
- obtaining capacity information on the new article and movement path information related to the new article based on a location of a user transferring the new article;
- determining an expected arrival time of the new article for storage in the refrigerator based on the movement path information during transit of the new article; and
- transmitting to the refrigerator, during transit of the new article, the movement path information, and the capacity information and the expected arrival time information of the new article for adjusting a setting of the refrigerator in preparation for storage of the new article in refrigerator to the refrigerator upon arrival at the refrigerator location.

* * * * *